(12) United States Patent
Uchiyama et al.

(10) Patent No.: US 6,434,330 B1
(45) Date of Patent: Aug. 13, 2002

(54) LENS-FITTED PHOTO FILM UNIT OF WATERPROOF TYPE AND DISASSEMBLING METHOD FOR THE SAME

(75) Inventors: Keiji Uchiyama; Masahiro Akiyama; Yoshikazu Majima; Nobuyuki Kameyama, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/668,749

(22) Filed: Sep. 25, 2000

(30) Foreign Application Priority Data

Sep. 28, 1999 (JP) .............................. 11-275152
Sep. 28, 1999 (JP) .............................. 11-275153

(51) Int. Cl.[7] .............................................. G03B 17/08
(52) U.S. Cl. ........................................ 396/27; 396/29
(58) Field of Search ................... 396/6, 25, 27, 396/29, 535

(56) References Cited

U.S. PATENT DOCUMENTS 5,832,312 A * 11/1998 Rieger et al. ............... 396/25
6,075,944 A *  6/2000 Balling et al. ............... 396/6

* cited by examiner

*Primary Examiner*—David M. Gray
*Assistant Examiner*—Rochelle Blackman
(74) *Attorney, Agent, or Firm*—Young & Thompson

(57) ABSTRACT

A waterproof lens-fitted photo film unit includes a lens-fitted photo film unit. Between a case body and a rear lid, the lens-fitted photo film unit is contained in a watertight manner. A separation opening is formed in the case body. A separation access chamber has an entrance connected to the separation opening, and closes the separation opening in a watertight manner in a position interior with reference to the case body. The separation access chamber includes a thin wall having a small thickness, and is breakable by a separator tool having a long shape with a small width.

16 Claims, 12 Drawing Sheets

LENS-FITTED PHOTO FILM UNIT OF WATERPROOF TYPE AND DISASSEMBLING METHOD FOR THE SAME

BACKGROUND OF THE INVENTION

1. Field of the Invention

The present invention relates to a lens-fitted photo film unit of a waterproof type and a disassembling method for the same. More particularly, the present invention relates to a lens-fitted photo film unit of a waterproof type which can be disassembled easily and safely, and a disassembling method for the same.

2. Description Related to the Prior Art

A lens-fitted photo film unit is pre-loaded with photo film, and sold and used widely because of its great ease in handling and low price. There are various types of the lens-fitted photo film unit adapted to kinds of scenes and situations to be photographed in different manners. For example, a waterproof type of the lens-fitted photo film unit is known for the purpose of underwater photography. This type is constituted by the lens-fitted photo film unit and a waterproof case for containing the lens-fitted photo film unit in a watertight manner. A shutter mechanism in the lens-fitted photo film unit is operable by use of a mechanism disposed through the waterproof case.

The waterproof case as an element of the waterproof type is constituted by a front containing member, a rear containing member and a rubber packing. The front and rear containing members are respectively formed from transparent resin, and fitted on one another in a watertight manner with the rubber packing inserted between those. After all exposures are taken in the lens-fitted photo film unit in the waterproof case, the lens-fitted photo film unit as contained in the waterproof case is forwarded to a photo laboratory. Then a photofinishing operator separates the front and rear containing members from one another and removes the lens-fitted photo film unit from the waterproof case. The exposed photo film from the lens-fitted photo film unit is developed and subjected to printing.

To remove the lens-fitted photo film unit from the waterproof case, there is a small thickness portion formed in either of the front and rear containing members of the waterproof case with a smaller thickness. A process of the removal is as follows: At first, a separator tool, such as a screwdriver of a minus-shaped end, is used to break through the small thickness portion. The end of the separator tool is inserted in the waterproof case. The end of the separator tool is engaged with a lateral side of the lens-fitted photo film unit, and forcibly moved to push the lens-fitted photo film unit out of the waterproof case. Thus, the lens-fitted photo film unit and front containing member are removed together from the rear containing member, or the lens-fitted photo film unit and rear containing member are removed together from the front containing member.

However, there is a problem in the known type of the waterproof case in that operators hands treating the separator tool are likely to be injured by the end of the separator tool, because the separator tool may be slipped from the hands. There is a difficulty in exactly handling the separator tool, as the small thickness portion of the waterproof case of a very small size must be penetrated by the separator tool, and the forcibly moving operation for the separator tool must be precise.

SUMMARY OF THE INVENTION

In view of the foregoing problems, an object of the present invention is to provide a lens-fitted photo film unit of a waterproof type in which a waterproof case can be disassembled easily and safely to take photo film out of the lens-fitted photo film unit, and a disassembling method for the same.

In order to achieve the above and other objects and advantages of this invention, a waterproof lens-fitted photo film unit includes a lens-fitted photo film unit. First and second containing members contain the lens-fitted photo film unit therebetween in a watertight manner. A separation opening is formed in the first containing member. A separation access chamber has an entrance connected to the separation opening, and closes the separation opening in a watertight manner in a position interior with reference to the first containing member. The separation access chamber includes a thin wall having a small thickness, and being breakable by a separator member having a long shape with a small width.

The second containing member is positioned on the first containing member in a first direction and fitted together. The thin wall is disposed in the first direction from a portion of the lens-fitted photo film unit oriented in the first direction, and broken through by the separator member. The lens-fitted photo film unit is pushed in a second direction opposite to the first direction by the separator member penetrating the first containing member, to separate the first containing member from the second containing member.

The thin wall is formed to project from an edge of the separation opening. The separation access chamber further includes an erect wall formed to project from a position in the edge of the separation opening opposite to the thin wall. A reinforcing projection is formed with the erect wall to project toward the thin wall, adapted to pivotal movement of the separator member about a fulcrum defined on a surface thereof, to break through the thin wall.

The first containing member includes a first case wall disposed outside one face of the lens-fitted photo film unit oriented in the first direction. A second case wall extends from the first case wall in the second direction, and is disposed outside one face of the lens-fitted photo film unit. The separation opening is formed in the second case wall and disposed close to the first case wall. The erect wall is constituted by a portion of the first case wall.

Furthermore, a receiving recess is formed in the lens-fitted photo film unit, disposed close to the thin wall, and pushed by the separator member after the separator member breaks through the thin wall.

The first direction is a forward direction. The first containing member is a case body of which a rear is open. The second containing member is a rear lid for closing the rear of the case body in a watertight manner.

In a disassembling method for the waterproof lens-fitted photo film unit, a separator member having a long shape with a small width is inserted in the separation opening. The thin wall is broken through by pivotally moving the separator member about a fulcrum defined on an edge of the separation opening. After breaking of the separator member through the thin wall, the first containing member is separated from the second containing member with the separator member.

The second containing member is positioned on the first containing member in a first direction and fitted together. The thin wall is disposed in the first direction from a portion of the lens-fitted photo film unit oriented in the first direction, and broken through by the separator member. The separating step includes pushing the lens-fitted photo film unit in a second direction opposite to the first direction by pivotally moving the separator member about a fulcrum defined on the edge of the separation opening while the separator member penetrates the first containing member.

According to another aspect of the present invention, a waterproof lens-fitted photo film unit includes a lens-fitted photo film unit. First and second containing members contain the lens-fitted photo film unit therebetween in a watertight manner. A separation engaging portion is formed to project from or retreat from an outer surface of the first containing member, and engageable with a separator member. A thin portion is formed around the separation engaging portion, has a small thickness, and is breakable upon operation of the separator member to the separation engaging portion.

The separator member has a long shape with a small width, and has a driving surface oriented in a prescribed direction with reference to an axial direction thereof. The separation engaging portion has a driven surface engaged with the driving surface, and rotated by the separator member.

The first containing member includes a first case wall disposed outside one face of the lens-fitted photo film unit oriented in the first direction. A second case wall extends from the first case wall in the second direction, and is disposed outside one face of the lens-fitted photo film unit. The thin portion is formed in the second case wall and disposed close to the first case wall.

A ring-shaped groove is formed in the first containing member around the separation engaging portion, and has a bottom constituting the thin portion.

The separation engaging portion has a shape rotationally symmetrical about one rotational center.

The separation engaging portion includes plural recesses extending radially from the rotational center, and having an inner surface constituting the driven surface.

The thin portion has a thickness of 0.3–0.7 mm.

In a disassembling method for the waterproof lens-fitted photo film unit, a separator member is engaged with the separation engaging portion. The thin portion is broken by rotating the separator member. The separator member is caused to penetrate the first containing member through a broken position of the thin portion. While the separator member penetrates the first containing member, the first containing member is separated from the second containing member with the separator member.

The separator member includes a separator end portion having a plate shape with a small thickness, and having the driving surface.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
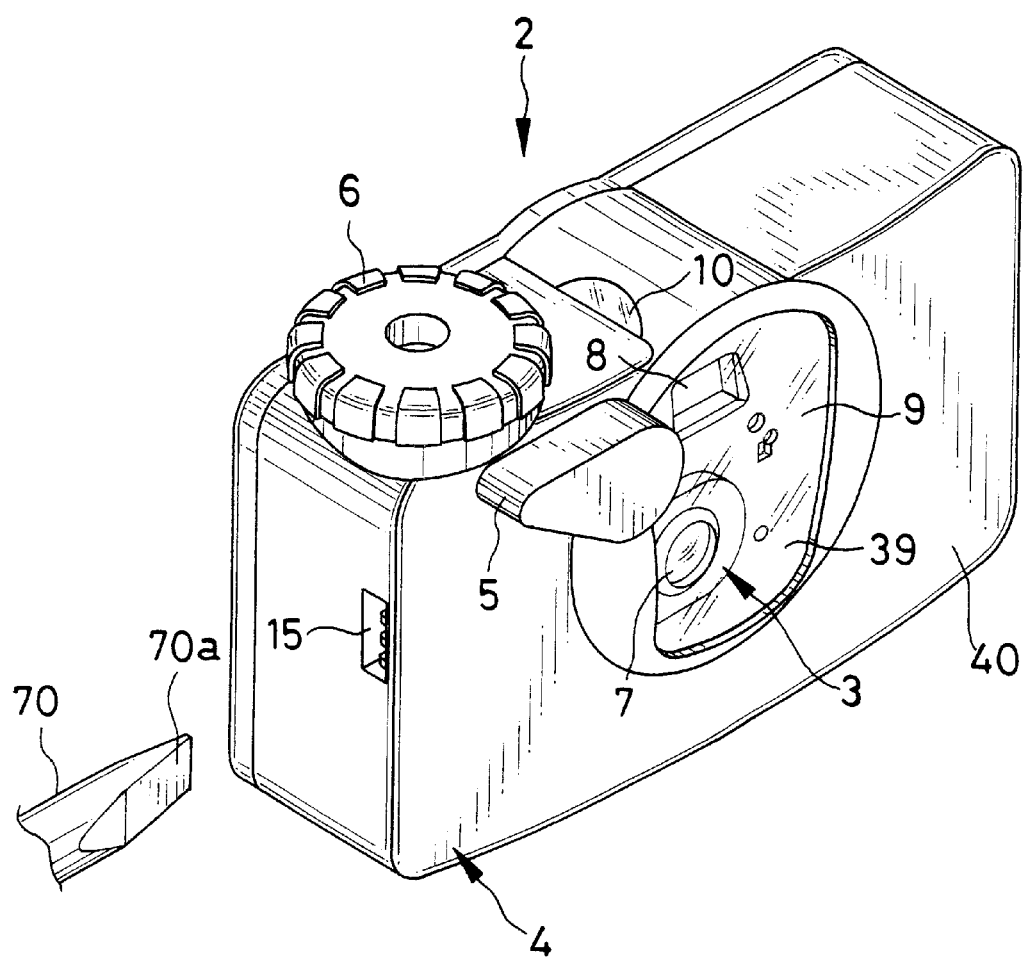
FIG. 1 is a perspective illustrating a waterproof type of lens-fitted photo film unit.

In FIG. 1, a waterproof type of lens-fitted photo film unit 2 is illustrated. The waterproof lens-fitted photo film unit 2 includes a lens-fitted photo film unit 3 and a waterproof case 4 for containing the lens-fitted photo film unit 3. An external shutter lever 5 is supported on a front face of the waterproof case 4 for releasing a shutter mechanism. An external winder wheel 6 is supported on an upper face of the waterproof case 4 for winding photo film. The lens-fitted photo film unit 3 has a taking lens 7 and a viewfinder objective window 8. The waterproof case 4 has a front case wall 9 with an external window in the waterproof case 4 for passage of light to the taking lens 7 and viewfinder objective window 8. Also, the waterproof case 4 has an upper case wall with an external window 10 through which light is passed to a frame counter window. There is a separation access chamber 15 in a lateral case wall of the waterproof case 4, to be described later in detail.

Figure 2:
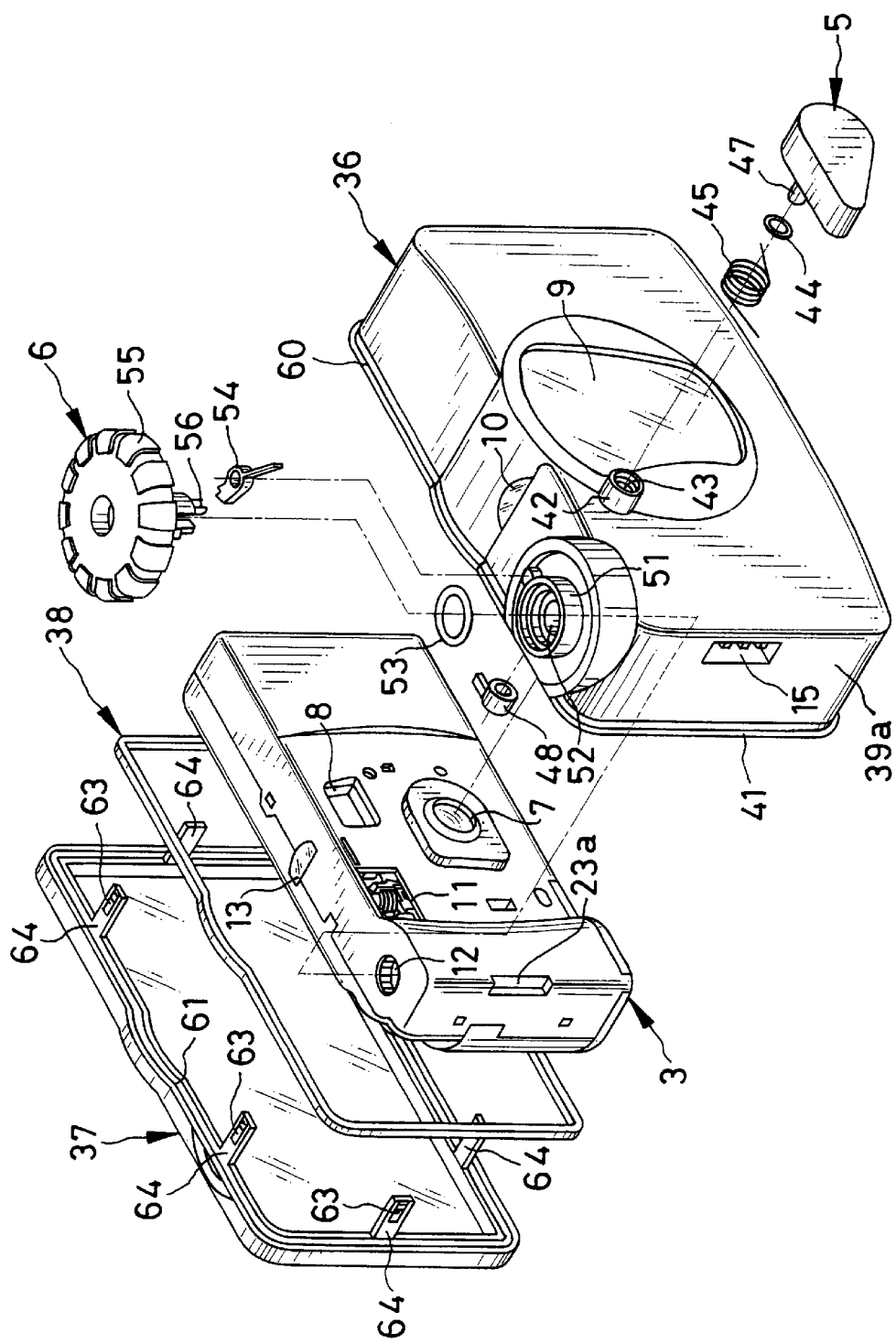
FIG. 2 is an exploded perspective illustrating the waterproof lens-fitted photo film unit.

In FIG. 2, the lens-fitted photo film unit 3 includes an access opening 11 in the front in addition to the taking lens 7 and viewfinder objective window 8. The top of the lens-fitted photo film unit 3 has a through hole 12 and a frame counter window 13. The rear of the lens-fitted photo film unit 3 has a viewfinder eyepiece window 14. See FIG. 3. A receiving recess 23a is formed in an outer surface of the lens-fitted photo film unit 3, and operates for engagement with a separator end portion 70a of a separator tool 70 at the time of removal of the lens-fitted photo film unit 3 from the waterproof case 4.

Figure 3:
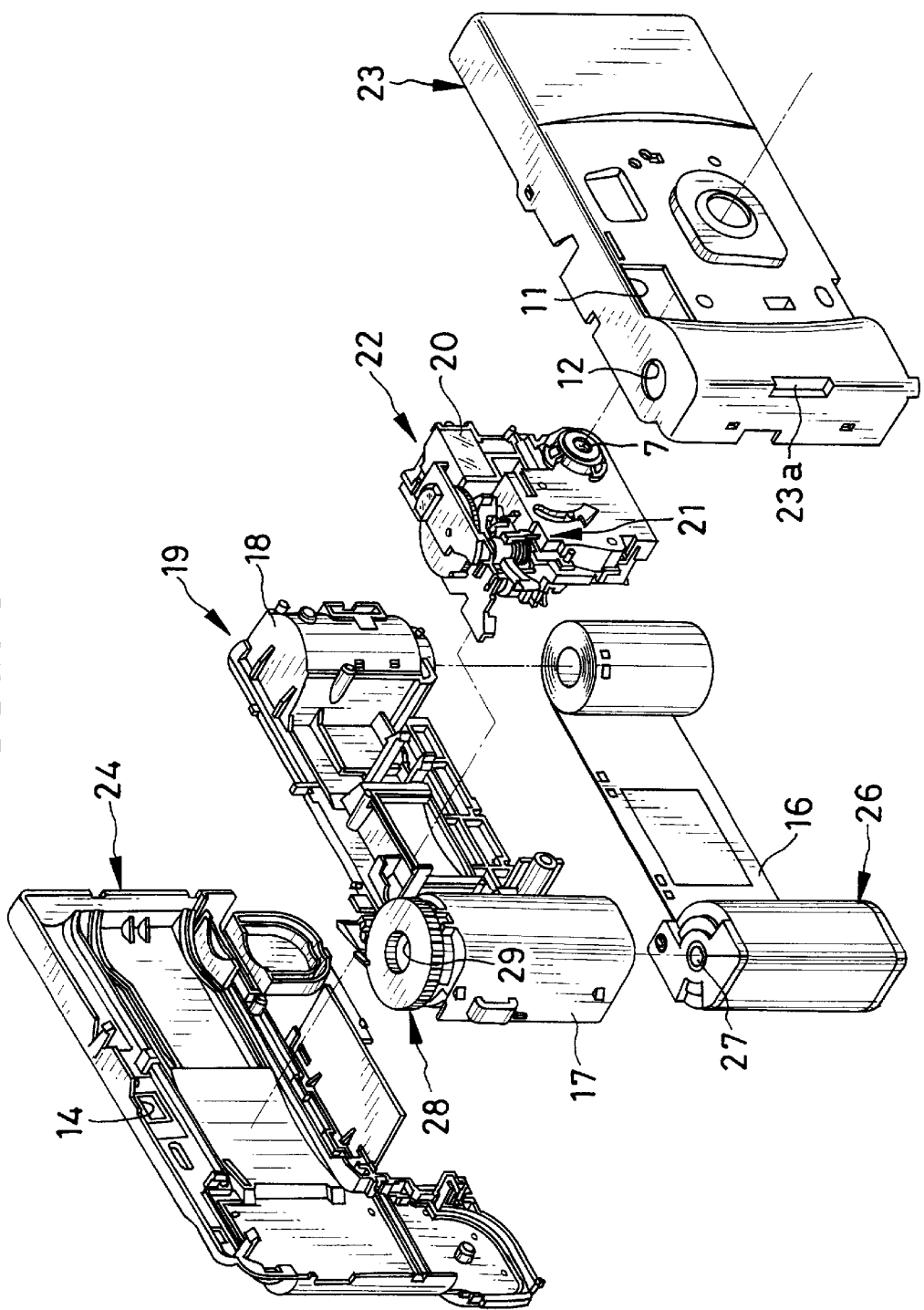
FIG. 3 is an exploded perspective illustrating a lens-fitted photo film unit accommodated in the waterproof lens-fitted photo film unit.

In FIG. 3, a structure of the lens-fitted photo film unit 3 is illustrated. The lens-fitted photo film unit 3 includes a main body 19, an exposure unit 22, a front cover 23 and a rear cover 24. The front cover 23 and rear cover 24 cover a front and rear of the main body 19. In the main body 19 are formed a cassette holder chamber 17 and a roll holder chamber 18. The cassette holder chamber 17 is loaded with a cassette shell of an unused photo film cassette. The roll holder chamber 18 is loaded with a roll of photo film drawn from the photo film cassette. The exposure unit 22 is secured to the main body 19, and includes the taking lens 7, a viewfinder optical system 20, a shutter mechanism 21, a one-frame advance mechanism, a frame counter mechanism and the like.

A winder wheel 28 is rotatable on an upper wall of the cassette holder chamber 17 of the main body 19. A spool 27 in a cassette shell 26 is engaged with a shaft of the winder wheel 28. An engaging hole 29 is formed in the center of the winder wheel 28, and accessible through the through hole 12 formed in the front cover 23. Teeth of a shaft of the external winder wheel 6 of the waterproof case 4 are meshed with inner teeth of the engaging hole 29, so that rotation of the external winder wheel 6 rotates the winder wheel 28. Note that a lens-fitted photo film unit of a general purpose type has a front cover in which a shutter release button is formed in the position where the through hole 12 is located in the waterproof type. In the present embodiment, the access opening 11 renders the shutter mechanism 21 of the exposure unit 22 accessible from the outside of the front cover 23.

In FIG. 2, the waterproof case 4 includes a case body 36 as first containing member, a rear lid 37 as second containing member and a packing 38. The case body 36 has an open rear side, and is fitted to the lens-fitted photo film unit 3 to cover front, upper, lower and lateral faces. The rear lid 37 is disposed behind the lens-fitted photo film unit 3 and fitted to the case body 36 to close the same. The packing 38 keeps the juncture between the case body 36 and rear lid 37 watertight.

Figure 4:
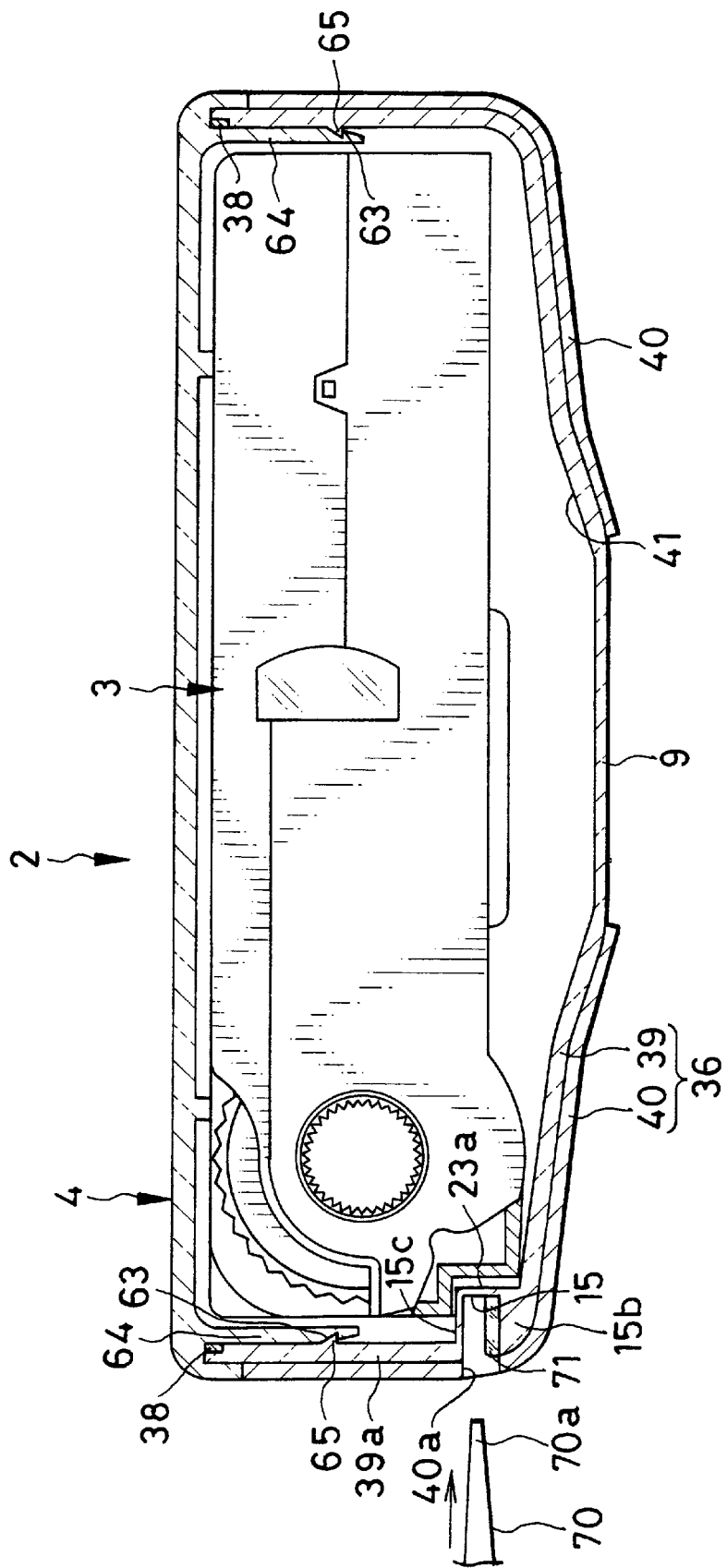
FIG. 4 is a horizontal section illustrating the waterproof lens-fitted photo film unit and a separator tool.

In FIG. 4, the case body 36 included in the waterproof lens-fitted photo film unit 2 is constituted by a box-shaped member 39 and an elastomer layer 40 or elastomer sheet. The box-shaped member 39 is plastic and transparent. The elastomer layer 40 is formed according to two-color forming, and fitted on a surface of the box-shaped member 39. The elastomer layer 40 is formed from elastomer or polymer material with elasticity in a manner of rubber, and operates to shield the waterproof case 4 from moisture and preventing slip of a user's hand. A front portion of the elastomer layer 40 has an opening uncovering the window in the front case wall 9 of the box-shaped member 39. An upper portion of the elastomer layer 40 has an opening uncovering the external window 10 in the upper case wall. A containing chamber 41 is formed in the case body 36 to open rearwards, and contains the lens-fitted photo film unit 3. See FIG. 2.

In FIG. 2, a boss 42 in a cylindrical shape is protruded from the case body 36. A hole 43 is defined in the boss 42, comes through the case body 36. An O-ring 44 is fitted on the inside of an end of the hole 43, and prevents moisture, dust or the like from entering the waterproof case 4 through the hole 43 in the boss 42.

The external shutter lever 5 generally has a wedge shape. A pivot 47 protrudes from the rear of the external shutter lever 5 and inserted in the hole 43 in the boss 42. A shutter transmission lever 48 is secured to the end of the pivot 47 after the external shutter lever 5 is inserted in the hole 43. When the lens-fitted photo film unit 3 is inserted in the case body 36, the shutter transmission lever 48 enters the access opening 11 in the front cover 23, and is engaged with a shutter mechanism in the exposure unit 22.

When the external shutter lever 5 is manually pushed down, the shutter mechanism 21 is actuated in the lens-fitted photo film unit 3. A torsion coil spring 45 is fitted on the outside of the boss 42, and biases the external shutter lever 5 in the clockwise direction to return the external shutter lever 5 to the initial position regularly.

A boss 51 in a cylindrical shape is protruded from the top of the case body 36. A hole 52 is defined in the boss 51, and comes through the case body 36. A shaft of the external winder wheel 6 is inserted in the hole 52 in a rotatable manner. An O-ring 53 is fitted on the inside of an end of the boss 51, and prevents moisture, dust or the like from entering the waterproof case 4 through the hole 52.

The external winder wheel 6 includes a wheel portion 55 and a drive shaft 56. The wheel portion 55 has a wheel shape with a pattern of projections or recesses for being fitted on a thumb of a user. The drive shaft 56 is formed on a lower face of the wheel portion 55. The drive shaft 56 is inserted in the hole 52 in the boss 51, and engaged with the engaging hole 29 in the winder wheel 28 through the through hole 12 in the front cover 23. When the external winder wheel 6 is rotated in the counterclockwise direction, the winder wheel 28 rotates in the same direction. The photo film after an exposure is wound into the cassette shell 26 by one frame.

An anti-rewind claw member 54 is disposed under the external winder wheel 6. When the external winder wheel 6 is rotated in the counterclockwise direction to wind the photo film, the anti-rewind claw member 54 is resiliently deformed by teeth formed with the external winder wheel 6 inside the wheel portion 55, and generates click noise in a ratchet operation. If force is applied to the external winder wheel 6 in the clockwise direction reverse to the photo film winding, the anti-rewind claw member 54 becomes firmly engaged with the teeth in the wheel portion 55, and keeps the external winder wheel 6 from rotating in reverse to the photo film winding.

In FIG. 4, one of two lateral case walls 39a is provided with the separation access chamber 15, which externally at a separation opening. Also, an opening 40a is formed in the elastomer layer 40. The separation access chamber 15 has a shape of a rectangular parallelepipedon, and positioned at the receiving recess 23a of the lens-fitted photo film unit 3 as accommodated in the waterproof case 4. After exposures are taken in the lens-fitted photo film unit 3, the separator tool 70 is inserted through the separation access chamber 15 to remove the lens-fitted photo film unit 3 from the waterproof case 4.

Figure 5:
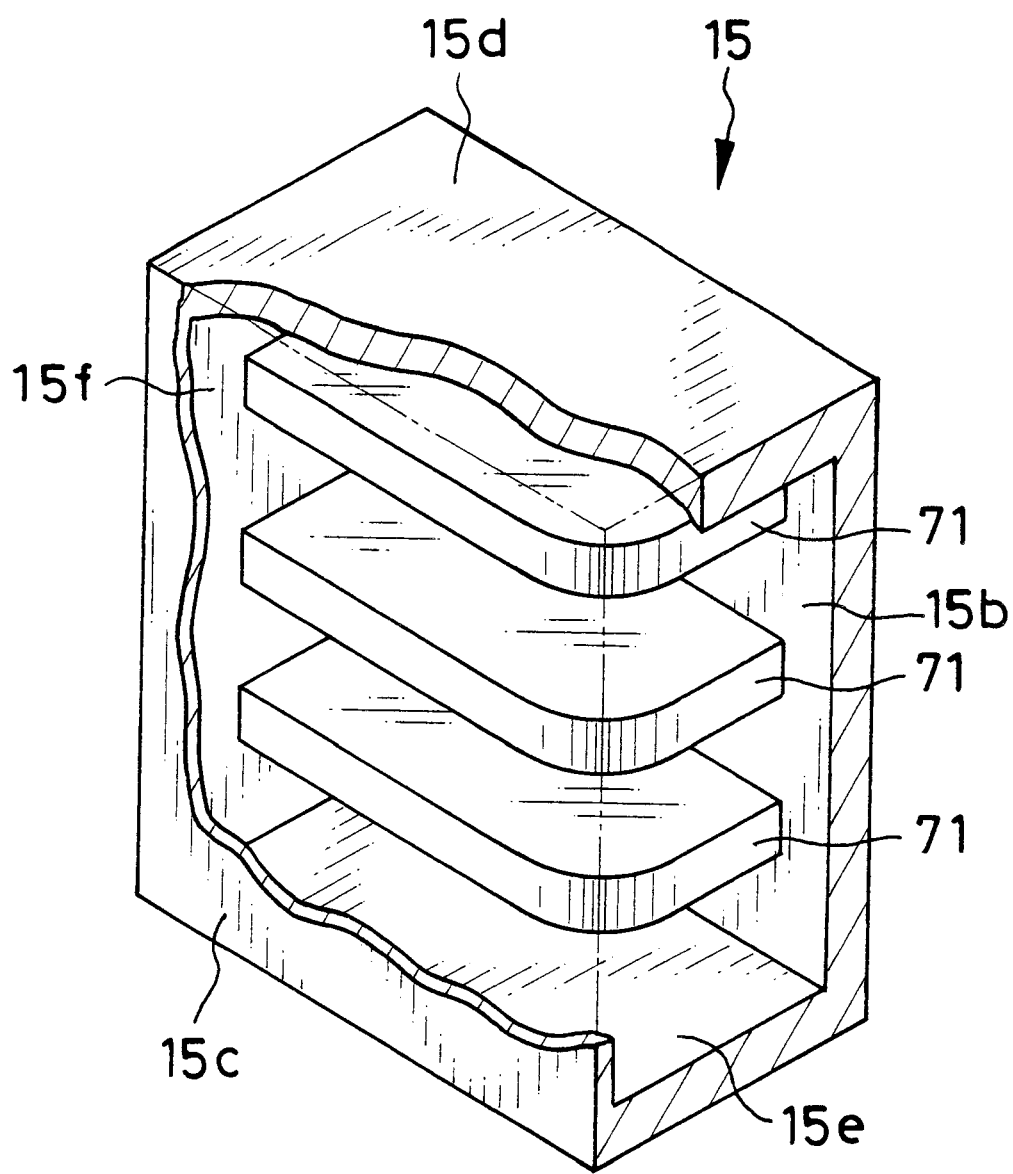
FIG. 5 is a perspective, partially broken, illustrating a separation access chamber with reinforcing projections.

In FIG. 5, the separation access chamber 15 is defined by plural walls, which include an erect wall 15b, a thin wall 15c, lateral walls 15d and 15e and a bottom wall 15f. The thin wall 15c and bottom wall 15f are positioned to face the receiving recess 23a, have a thickness smaller than the remaining case walls of the box-shaped member 39, and easily breakable by use of the separator tool 70 or a screwdriver with a minus-shaped end having a small width. Note that the erect wall 15b and lateral walls 15d and 15e have a thickness equal to that of the remaining case walls of the box-shaped member 39. Reinforcing ridges 71 are formed with the erect wall 15b, operate as a fulcrum at which the separator tool 70 is supported when thrust into the separation access chamber 15, and reinforce the erect wall 15b to avoid breakage. The three reinforcing ridges 71 are arranged vertically. Alternatively, two or less, or four or more reinforcing ridges can be formed. Furthermore, the erect wall 15b may be formed with a considerably great thickness without forming the reinforcing ridges 71. Such projections may have any suitable shape, for example a vertically extending ridge shape.

In FIG. 2, the rear lid 37 is formed from transparent plastic material, and allows external observation in the viewfinder eyepiece window 14. A groove 61 is formed in a peripheral portion of the rear lid 37. A ridge 60 is formed in a peripheral portion of the case body 36 in an edge of the containing chamber 41. The ridge 60 and packing 38 are both fitted in the groove 61. A width of the groove 61 is determined slightly smaller than a sum of thicknesses of the ridge 60 and packing 38. Thus, the packing 38 is compressed in the groove 61 and fitted inside the groove 61 very tightly, to keep water-tightness between the case body 36 and rear lid 37.

Hole-formed portions 64 are formed with edges of the rear lid 37, two with an upper edge, two with a lower edge, and one with each one of the lateral edges. Retaining holes 63 are formed in the hole-formed portions 64. Retaining claws 65 are formed with the inside of the case body 36, and engaged with the hole-formed portions 64 for retention. Thus, the rear lid 37 is firmly secured to the case body 36 by claw engagement, to ensure the water-tightness of the waterproof case 4.

The operation of the above embodiment is described. In the waterproof lens-fitted photo film unit 2, exposures are taken to the photo film, before all the photo film is wound. The waterproof lens-fitted photo film unit 2 without being assembled or broken is forwarded to a photofinisher. The waterproof lens-fitted photo film unit 2 is forwarded from the photofinisher to a photo laboratory of a large scale.

Figure 6:
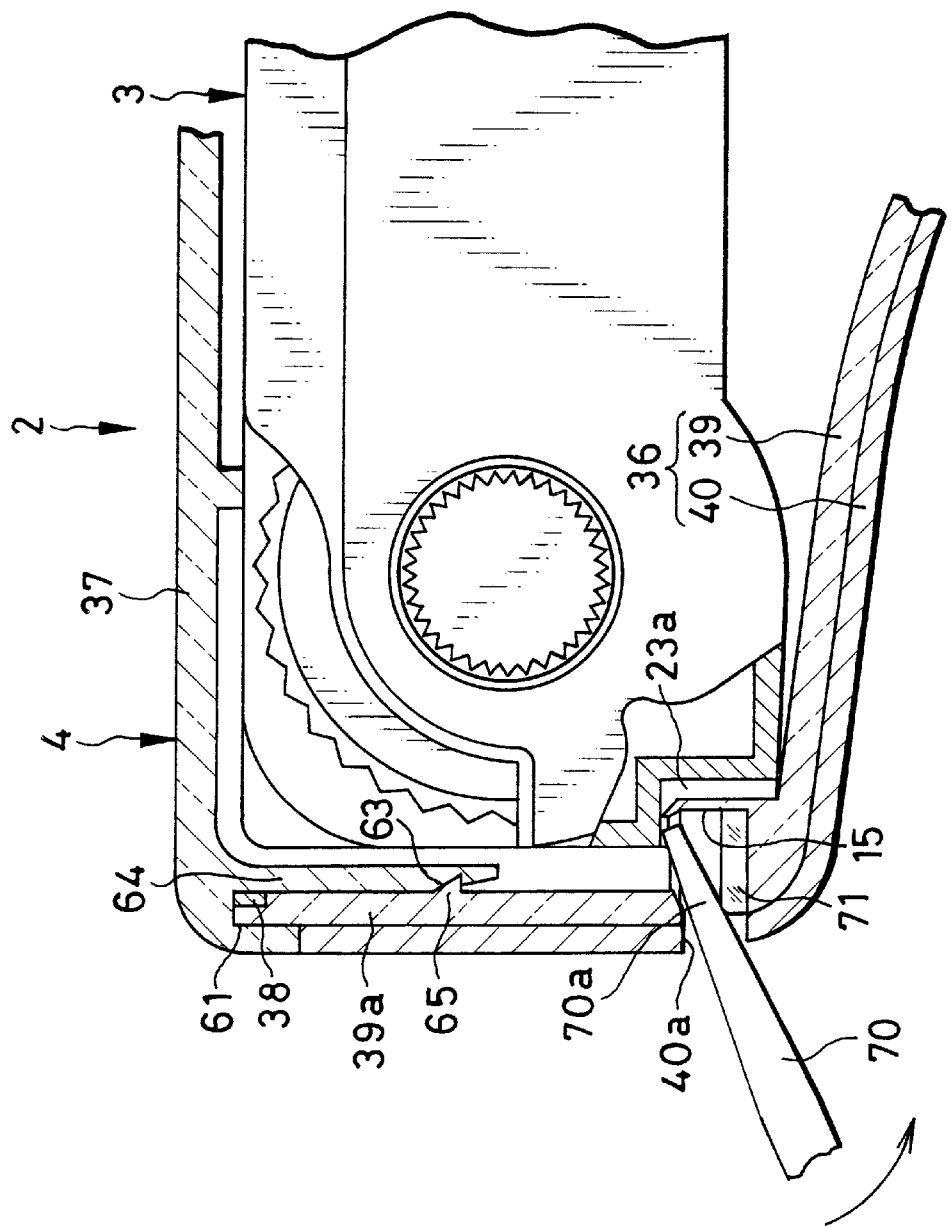
FIG. 6 is an explanatory view in section, illustrating a step of breaking through a breakable thin wall inside the separation access chamber.

In a photo laboratory, the lens-fitted photo film unit 3 is removed from the waterproof case 4. The separator tool 70 such as a screwdriver of a minus type is used. In FIG. 6, the separator tool 70 is inserted in the separation access chamber 15 formed with the box-shaped member 39 in the waterproof case 4, and is swung in the forward direction with respect to the waterproof case 4 by a lever operation with a fulcrum at the reinforcing ridges 71 and elastomer layer 40. The thin wall 15c of the separation access chamber 15 is thrust through by the separator tool 70, which reaches the inside of the waterproof case 4.

Figure 7:
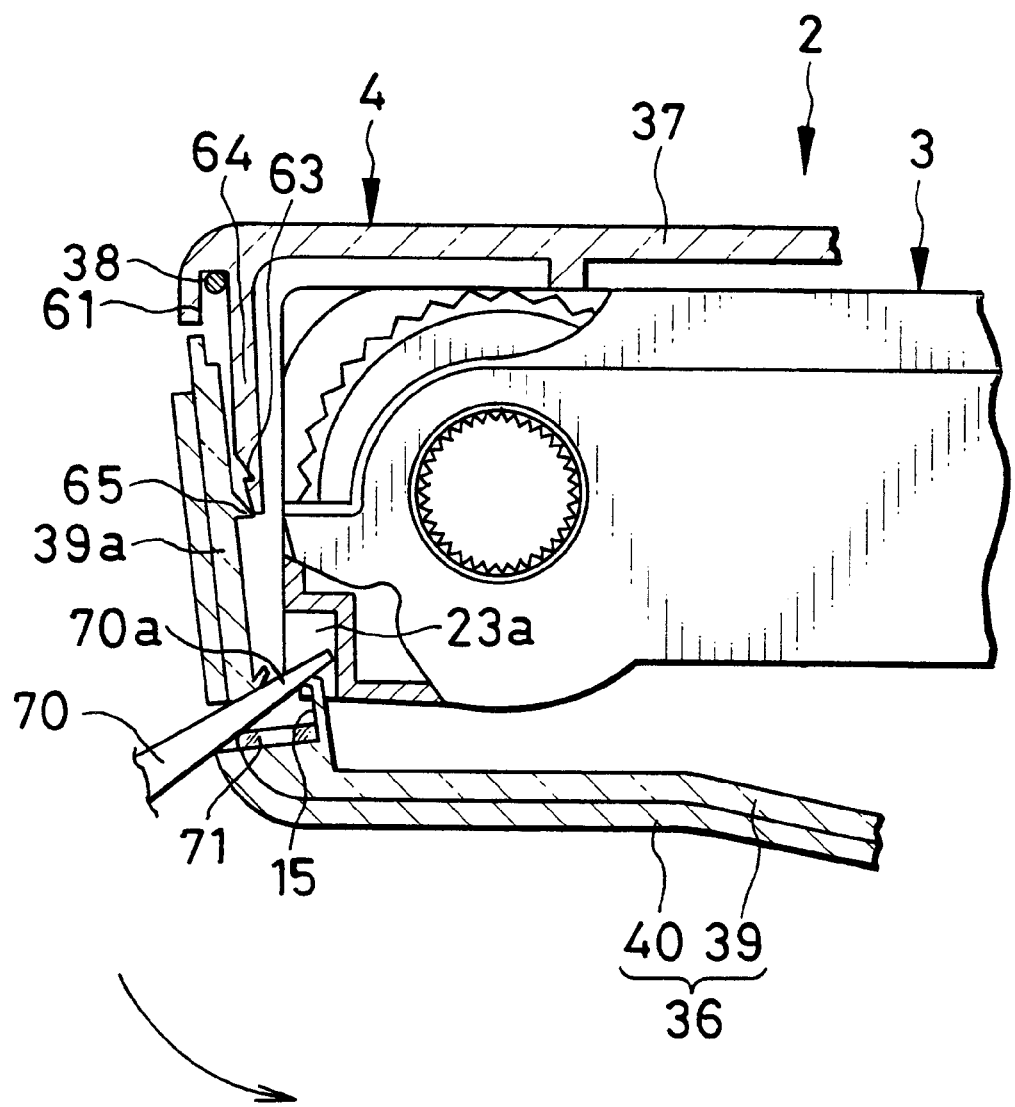
FIG. 7 is an explanatory view in section, illustrating a step of removing a case body from a rear lid and the lens-fitted photo film unit.
Figure 8:
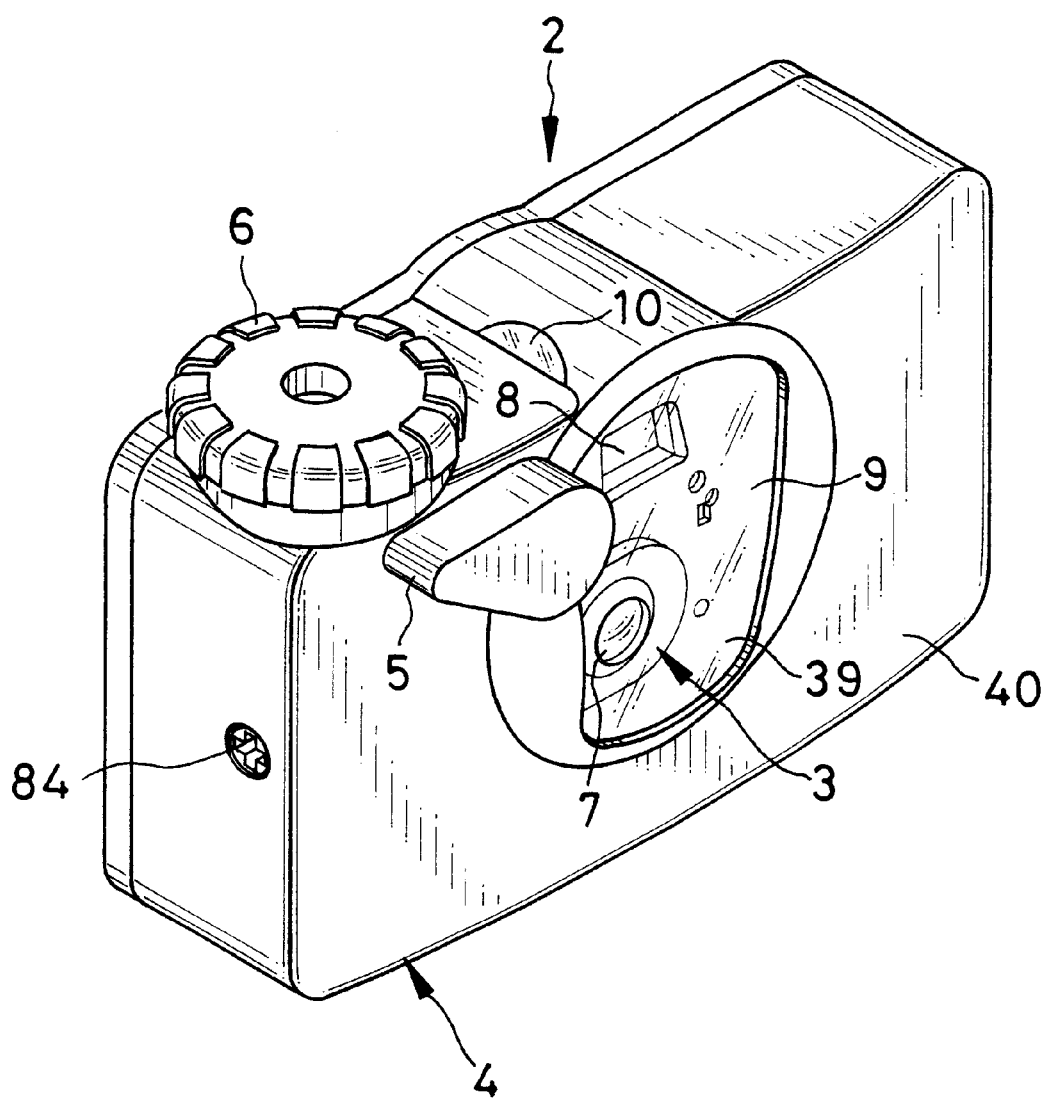
FIG. 8 is a perspective illustrating another preferred waterproof type of lens-fitted photo film unit provided with a separation engaging portion.
Figure 9:
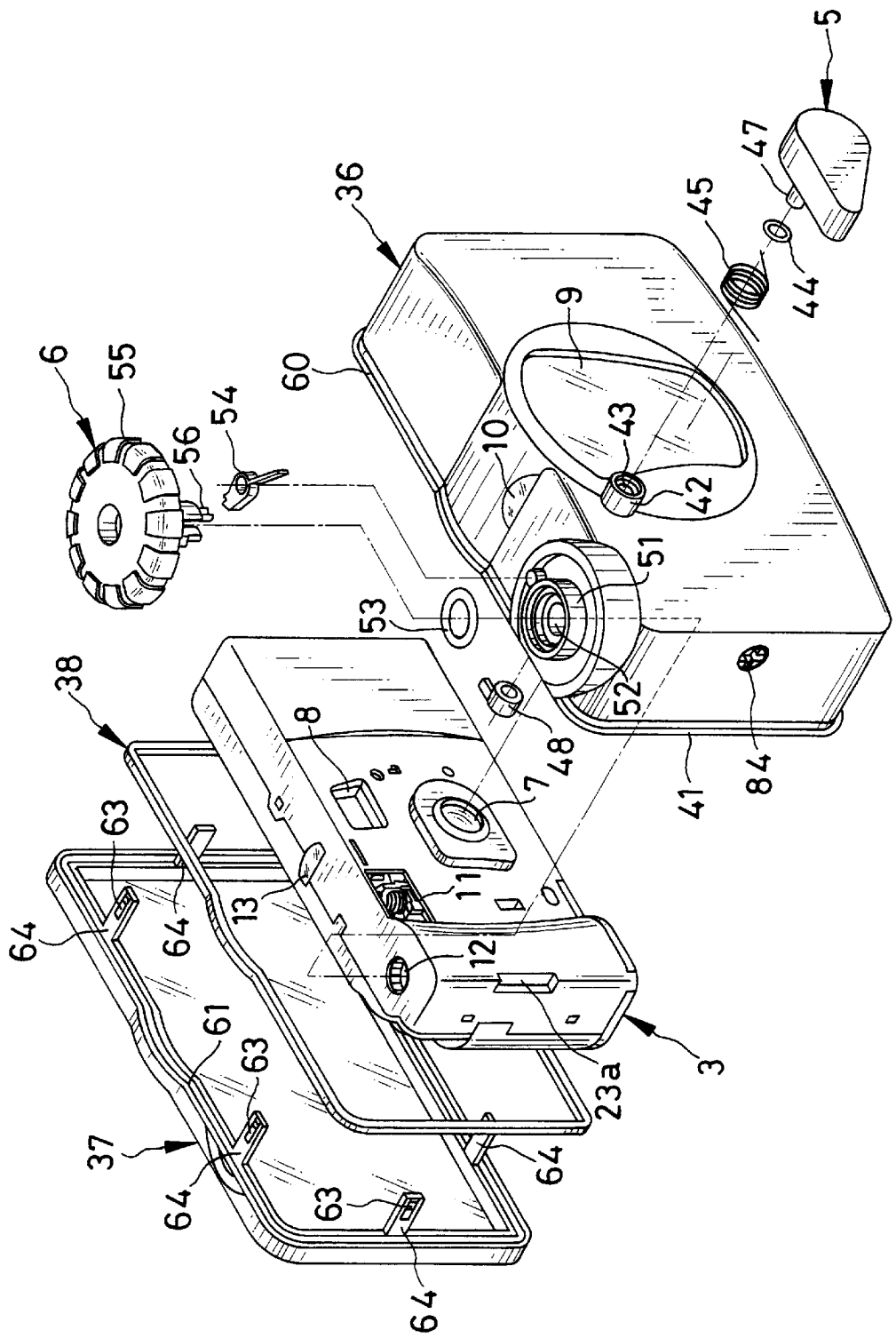
FIG. 9 is an exploded perspective illustrating the waterproof lens-fitted photo film unit.

The receiving recess 23a in the lens-fitted photo film unit 3 is positioned at the separation access chamber 15. The separator tool 70 is inclined toward the front of the waterproof case 4 in a manner of a lever operation. The separator end portion 70a of the separator tool 70 penetrates a hole at the separation access chamber 15 as broken, and comes in contact with the receiving recess 23a. Upon contact of the separator end portion 70a with the receiving recess 23a, the separator tool 70 is further inclined toward the front of the waterproof case 4 in a manner of a lever operation. See FIG. 7.

Thus, the lens-fitted photo film unit 3 is pressed against the inner surface of the rear lid 37 of the waterproof case 4, and disengage the retaining claws 65 from the retaining holes 63. See FIG. 7. The open side of the case body 36 is separated from the groove 61 of the rear lid 37. The lens-fitted photo film unit 3 with the rear lid 37 is removed from the case body 36, and taken out of the waterproof case 4.

Accordingly, insertion of the separator tool 70 through the separation access chamber 15 and inclination of the separator tool 70 cause removal of the rear lid 37 and lens-fitted photo film unit 3 from the case body 36. It is possible easily to remove the lens-fitted photo film unit 3 from the waterproof case 4 safely, because operators will not be injured by the separator end portion 70a of the separator tool 70.

In the present embodiment, the separation access chamber 15 is in a position on a left lateral case wall of the case body 36 and close to a front edge. However, the separation access chamber 15 may be disposed in any suitable position, for example, in a right lateral case wall, a lower case wall, or an upper case wall of the case body 36. Also, the separation access chamber 15 may be formed with the rear lid 37. In the above embodiment, the separation access chamber 15 has a shape of a rectangular parallelepipedon. However, the separation access chamber 15 may have a shape suitable for insertion of a separator tool.

For example, at least either one of the thin wall 15c and erect wall 15b in the separation access chamber 15 may be curved or bent. Also, the separation access chamber 15 may lack the bottom wall 15f between the thin wall 15c and erect wall 15b. For example, the separation access chamber 15 may have a shape of a triangular prism, a half cylinder, a half ellipsoid, a hemisphere and the like.

In the above embodiment, the separator end portion 70a of the separator tool 70 pushes the lens-fitted photo film unit 3 to separate the waterproof case 4. Alternatively, the separator end portion 70a of the separator tool 70 may push one of the two containing members of the waterproof case 4 away from the remainder for separation. For this operation, the first member is provided with the separation access chamber 15. The remainder may be provided with the receiving recess 23a, opposed to a thin wall included in the separation access chamber 15, for receiving contact of an end of the separator tool. Also, containing members of the waterproof case 4 may be separated in a vertical direction, or in a horizontal direction toward the right or left. Furthermore, it is possible not to form the reinforcing ridges 71 with the separation access chamber 15.

In the above embodiment, the separator end portion 70a of the separator tool 70 or screwdriver has a plate shape with a small width and a decreasing thickness. However, the separator end portion 70a may have any long shape with a small width, for example may have a rod shape or a plate shape. A thickness or diameter of the separator end portion 70a may be predetermined unchanged or decreasing toward its tip.

Figure 10:
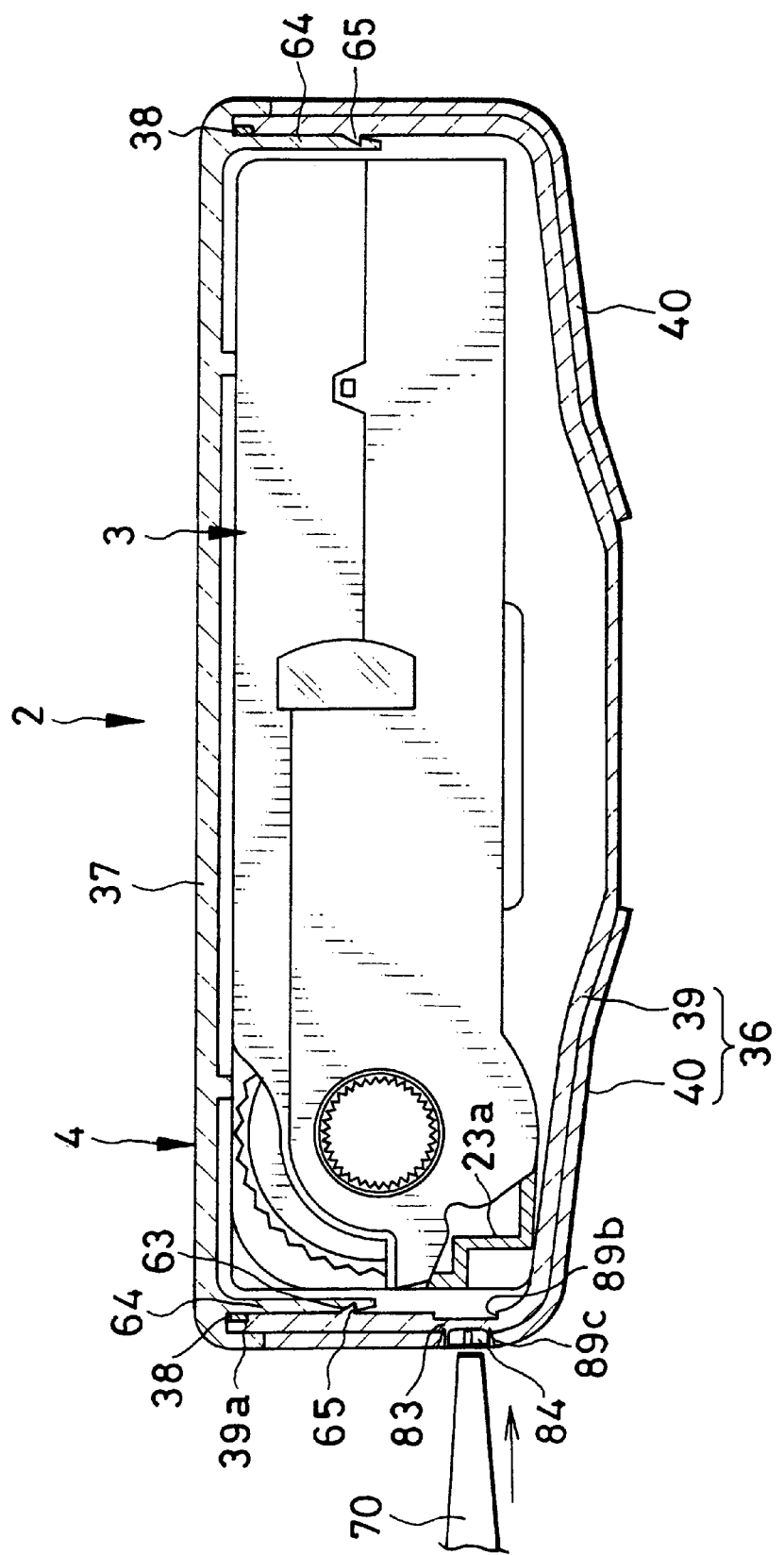
FIG. 10 is a horizontal section illustrating the waterproof lens-fitted photo film unit and separator tool.
Figure 11A:
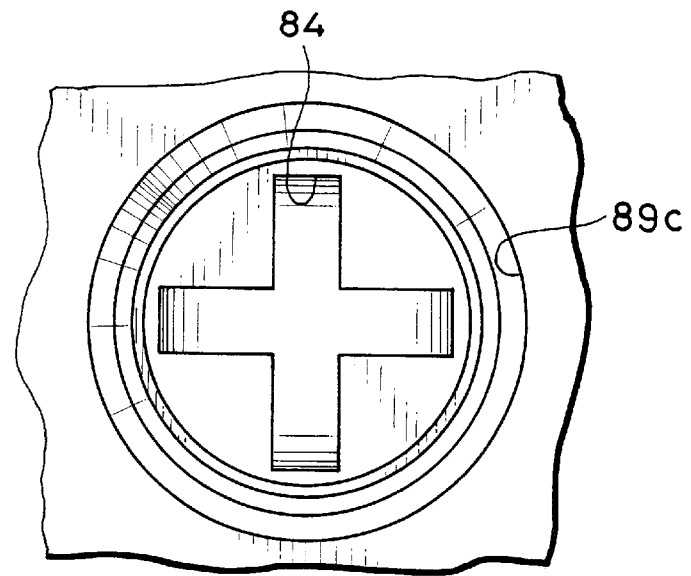
FIG. 11A is an explanatory view in plan, illustrating the separation engaging portion.
Figure 11B:
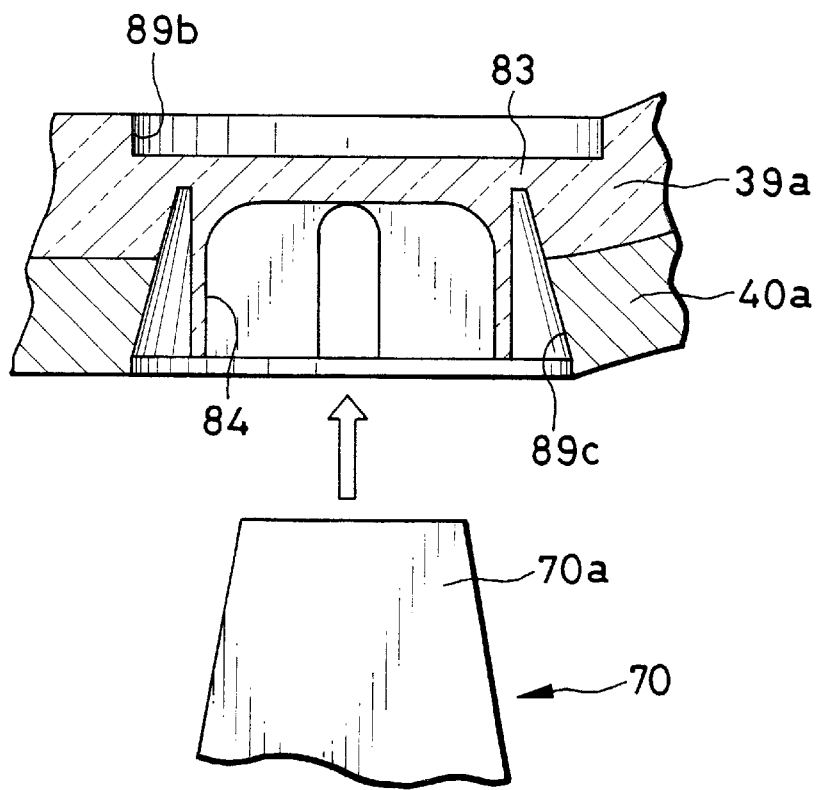
FIG. 11B is an explanatory view in section and elevation, illustrating the separation engaging portion with the separator tool.

Another preferred embodiment is described with reference to FIGS. 8–12, in which a separation engaging portion 84 with plural combined recesses is formed. In FIG. 10, the lateral case wall 39a has the separation engaging portion 84. The opening 40a is formed in the elastomer layer 40 and positioned at the separation engaging portion 84. In FIGS. 11A and 11B, the separation engaging portion 84 consists of a recess in a cross shape. The separator tool 70 for use with the separation engaging portion 84 may be a screwdriver either with a minus-shaped end or a plus-shaped end.

In FIGS. 11A and 11B, a ring-shaped breakable groove 89c is formed in an outer surface of the box-shaped member 39 and around the separation engaging portion 84. A circular recess 89b is formed in an inner surface of the box-shaped member 39. A thin portion 83 is defined between the ring-shaped breakable groove 89c and circular recess 89b in a position to surround the separation engaging portion 84. A preferable thickness of the thin portion 83 is in a range of 0.3–0.7 mm. The separation engaging portion 84 is positioned close to the receiving recess 23a of the lens-fitted photo film unit 3 as accommodated in the waterproof case 4.

Note that the circular recess 89b may not be formed. The thin portion 83 can be formed sufficiently thinly by forming the ring-shaped breakable groove 89c even without the circular recess 89b. Also, the ring-shaped breakable groove 89c may be formed in the inner surface of the box-shaped member 39.

At the time of removal, the separator end portion 70a of the separator tool 70 is engaged with the separation engaging portion 84 in the box-shaped member 39 of the waterproof case 4, and is manually rotated. Rotational force of the separator end portion 70a breaks the thin portion 83, to break away the separation engaging portion 84 from the box-shaped member 39. Then the separator tool 70 is inserted in the waterproof case 4.

Figure 12:
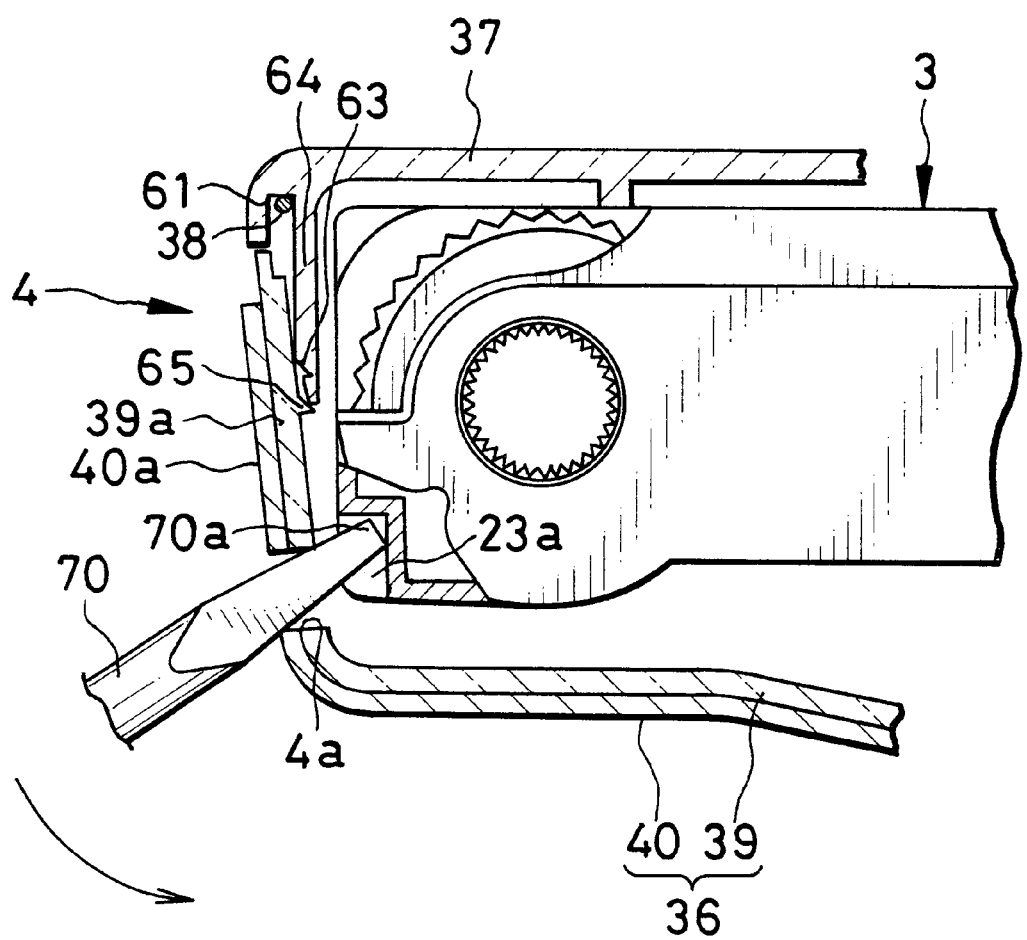
FIG. 12 is an explanatory view in section, illustrating step of removing a case body from a rear lid and the lens-fitted photo film unit.

The receiving recess 23a of the lens-fitted photo film unit 3 is located in the position associated with a hole 4a. So the separator end portion 70a of the separator tool 70 contacts the receiving recess 23a. In FIG. 12, the separator tool 70 is swung in the forward direction with reference to the waterproof case 4. Thus, the lens-fitted photo film unit 3 is pressed by the separator tool 70 against the inner surface of the rear lid 37 of the waterproof case 4, and disengages the retaining claws 65 from the retaining holes 63. The open side of the case body 36 is separated from the groove 61 of the rear lid 37. The lens-fitted photo film unit 3 with the rear lid 37 is removed from the case body 36, and taken out of the waterproof case 4.

In the present embodiment, the separation engaging portion 84 is in the position on the left lateral case wall of the case body 36 and close to the front edge. However, the separation engaging portion 84 may be disposed in any suitable position, for example, in a right lateral case wall, a lower case wall, or an upper case wall.

Also, the separation engaging portion 84 may be formed with the rear lid 37.

In the above embodiment, the separation engaging portion 84 is the recesses combined in the plus shape or cross shape. However, the separation engaging portion 84 may have any suitable shape with which rotation can be transmitted from a separator tool. For example, the separation engaging portion 84 may have a simple recess in a minus shape or straight line shape, a hole in a shape of a regular hexagon, a hole of a certain spanner, a hole of a semi-circular shape, a boss with a key, or the like.

Furthermore, the separation engaging portion 84 may have a projecting shape instead of the above negative shape, and may have a shape of, for example, a frustum of a polygonal pyramid. For use with this, a separator tool may have an end with a recess shaped for transmitting rotation, and may have a shape of, for example, a spanner with a polygonal hole.

In the above embodiment, the entirety of the thin portion 83 is broken by rotation of the separator tool 70 to form a nearly circular through hole after removal of the separation engaging portion 84. However, only a part of the thin portion 83 may be broken for the purpose of removal of the waterproof case 4. For example, a part of the thin portion 83 along ¾ of its circumference may be broken with the remaining ¼ kept connected. When the cut along ¾ of the thin portion 83 is formed, an operator can disengage the separator tool 70 from the separation engaging portion 84, and then insert the separator end portion 70a of the separator tool 70 into the cut of the thin portion 83 to reach the lens-fitted photo film unit 3.

In the above embodiments, the waterproof type of lens-fitted photo film unit 2 consists of a lens-fitted photo film unit 3 and a waterproof case 4. Furthermore, any type of optical instrument may be contained in the waterproof case 4 in the present invention, to constitute a waterproof type of optical instrument, for example a camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A waterproof type of lens-fitted photo film unit comprising:

a lens-fitted photo film unit pre-loaded with photo film;

a waterproof case for containing said lens-fitted photo film unit in a watertight manner, said waterproof case having first and second members connected with one another;

a separation access chamber arranged on one of the first and second members, the chamber being open to an outside of the waterproof case, the chamber being defined by a plurality of walls including a reinforced wall and a thin wall opposite the reinforced wall, wherein a thickness of the reinforced wall is greater than a thickness of the thin wall.

2. A waterproof type of lens-fitted photo film unit as defined in claim 1, wherein said separation access chamber is arranged so that a separator member inserted into the separation access chamber and operated as a lever to contact as a fulcrum an outer portion of the reinforced wall will apply force to the thin wall, and wherein if the force applied to the thin wall is sufficient to break the thin wall, further pivoting of said separator member will push said lens-fitted photo film unit and said first member away from each other, to disconnect said first and second members from each other.

3. A waterproof type of lens-fitted photo film unit as defined in claim 2, further comprising at least one ridge extending away from the reinforced wall toward the thin wall and arranged so that the at least one ridge operates as said fulcrum for said separator member when said separator member is caused to make said lever operation to break said thin wall.

4. A waterproof type of lens-fitted photo film unit as defined in claim 2, wherein said first member is a case body having a box shape of which a rear is open and which includes a front case wall, an upper case wall, a lower case wall, a right lateral case wall and a left lateral case wall, and said lens-fitted photo film unit is contained in said case body and has a front face positioned behind said front case wall; and said second member is a rear lid for closing said rear of said case body in a watertight manner.

5. A waterproof type of lens-fitted photo film unit as defined in claim 4, wherein said separation access chamber is disposed on at least one of said upper case wall, said lower case wall, said right lateral case wall and said left lateral case wall.

6. A waterproof type of lens-fitted photo film unit comprising:

a lens-fitted photo film unit pre-loaded with photo film;

a waterproof case for containing said lens-fitted photo film unit in a watertight manner, said waterproof case having first and second members connected with one another;

a separation engaging portion in which a separator member is insertable toward an inside of said waterproof case, and which is formed with said first member;

a breakable groove, formed about said separation engaging portion, for reducing a thickness thereabout, said separation engaging portion being forcibly broken along said breakable groove when said separation engaging portion is rotated by a separator member, to form a separation opening.

7. A waterproof type of lens-fitted photo film unit as defined in claim 6, wherein said lens-fitted photo film unit includes a receiving portion, positioned at said separation engaging portion, for receiving said end of said separator member inserted into said separation opening, said separator member is caused to make a lever operation in which said receiving portion constitutes a fulcrum and said separation opening constitutes an action point, and said separator member pushes said lens-fitted photo film unit and said first member away from each other, to disconnect said first and second members from each other.

8. A waterproof type of lens-fitted photo film unit as defined in claim 7, wherein said receiving portion includes a recess.

9. A waterproof type of lens-fitted photo film unit as defined in claim 7, wherein said breakable groove has a circular shape.

10. A waterproof type of lens-fitted photo film unit as defined in claim 7, wherein said separation engaging portion includes an engaging groove having a cross shape.

11. A waterproof type of lens-fitted photo film unit as defined in claim 7, wherein said first member is a case body having a box shape of which a rear is open and which includes a front case wall, an upper case wall, a lower case wall, a right lateral case wall and a left lateral case wall, and said lens-fitted photo film unit is contained in said case body and has a front face positioned behind said front case wall; and said second member is a rear lid for closing said rear of said case body in a watertight manner.

12. A waterproof type of lens-fitted photo film unit as defined in claim 11, wherein said separation engaging portion is formed with at least one of said upper case wall, said lower case wall, said right lateral case wall and said left lateral case wall.

13. A disassembling method for a waterproof type of lens-fitted photo film unit;

said waterproof type of said lens-fitted photo film unit having a lens-fitted photo film unit and a waterproof case for containing said lens-fitted photo film unit, said waterproof case having first and second members connected with each other, said disassembling method comprising steps of:

inserting a separator member into a separation access chamber disposed on one of the first and second members, the separation access chamber being open to an exterior of the waterproof case, the chamber being defined by a plurality of walls including a reinforced wall and a thin wall opposite the reinforced wall, wherein a thickness of the reinforced wall is greater than a thickness of the thin wall;

inclining said separator member in said separation access chamber using an outer edge of the reinforced wall as a fulcrum to apply force to the thin wall until the thin wall is broken;

inserting said separator member further into said first member through said broken thin wall, to place said end of said separator member in a receiving portion of said lens-fitted photo film unit; and further inclining said separator member as a lever so that said lens-fitted photo film unit and said first member are pushed away from each other, to disconnect said first and second members from each other for removal of said lens-fitted photo film unit from said waterproof case.

14. A disassembling method as defined in claim 13, wherein said first member is a case body having a box shape of which a rear is open and which includes a front case wall, an upper case wall, a lower case wall, a right lateral case wall and a left lateral case wall, and said lens-fitted photo film unit is contained in said case body and has a front face positioned behind said front case wall, said separation access being disposed on at least one of said upper case wall, said lower case wall, said right lateral case wall and said left lateral case wall; and said second member is a rear lid for closing said rear of said case body in a watertight manner.

15. A disassembling method for a waterproof type of lens-fitted photo film unit;

said waterproof type of said lens-fitted photo film unit having a lens-fitted photo film unit and a waterproof case for containing said lens-fitted photo film unit, said waterproof case having first and second members connected with each other, said disassembling method comprising steps of:

inserting said separator member in a separation engaging portion toward an inside of said waterproof case, said separation engaging portion being formed with said first member;

rotating said separator member with said separation engaging portion, said separator member forcibly breaking said separation engaging portion along a breakable groove to form a separation opening, said breakable groove being formed about said separation engaging portion;

inserting said separator member further into said first member through said separation opening, to place said end of said separator member in a receiving portion of said lens-fitted photo film unit; and causing said separator member to make a lever operation in which said receiving portion constitutes a fulcrum and said separation access section constitutes an action point, said lens-fitted photo film unit and said first member being pushed away from each other, to disconnect said first and second members from each other for removal of said lens-fitted photo film unit from said waterproof case.

16. A disassembling method as defined in claim 15, wherein said first member is a case body having a box shape of which a rear is open and which includes a front case wall, an upper case wall, a lower case wall, a right lateral case wall and a left lateral case wall, and said lens-fitted photo film unit is contained in said case body and has a front face positioned behind said front case wall, said separation engaging portion is formed with at least one of said upper case wall, said lower case wall, said right lateral case wall and said left lateral case wall; and said second member is a rear lid for closing said rear of said case body in a watertight manner.

* * * * *